United States Patent
Kim et al.

(10) Patent No.: US 10,053,864 B2
(45) Date of Patent: Aug. 21, 2018

(54) ONE-TOUCH COUPLING CLIP FOR COUPLING REINFORCING BARS

(71) Applicants: Hyung Sub Kim, Gumi-si (KR); Su Ik Han, Gumi-si (KR)

(72) Inventors: Hyung Sub Kim, Gumi-si (KR); Su Ik Han, Gumi-si (KR)

(73) Assignee: SPIDER K CO., LTD., Busan (KR)

( * ) Notice: Subject to any disclaimer, the term of this patent is extended or adjusted under 35 U.S.C. 154(b) by 0 days.

(21) Appl. No.: 15/559,570

(22) PCT Filed: Mar. 3, 2016

(86) PCT No.: PCT/KR2016/002138
§ 371 (c)(1),
(2) Date: Sep. 19, 2017

(87) PCT Pub. No.: WO2016/153188
PCT Pub. Date: Sep. 29, 2016

(65) Prior Publication Data
US 2018/0044920 A1    Feb. 15, 2018

(30) Foreign Application Priority Data
Mar. 20, 2015    (KR) ........................ 10-2015-0038864

(51) Int. Cl.
*E04C 5/16* (2006.01)
*F16B 7/04* (2006.01)
(Continued)

(52) U.S. Cl.
CPC ............... *E04C 5/167* (2013.01); *E04C 5/16* (2013.01); *E04C 5/208* (2013.01); *F16B 7/0493* (2013.01); *E04C 5/01* (2013.01)

(58) Field of Classification Search
CPC . E04C 5/167; E04C 5/16; E04C 5/168; E04C 5/163; F16B 7/0493; F16B 7/044; E04G 21/22; B23P 11/00
See application file for complete search history.

(56) References Cited

U.S. PATENT DOCUMENTS 606,461 A * 6/1898 Johnson ................ F16B 7/0493
403/395
809,549 A * 1/1906 Beyerle ................ F16B 7/0493
24/115 A
(Continued)

FOREIGN PATENT DOCUMENTS

JP    11-502578 A    3/1999
JP    2002-038656 A    2/2002
(Continued)

*Primary Examiner* — Adriana Figueroa
*Assistant Examiner* — Jessie T Fonseca
(74) *Attorney, Agent, or Firm* — Rabin & Berdo, P.C.

(57) ABSTRACT

A coupling clip for coupling an upper reinforcing bar and a lower reinforcing bar includes a pair of side members spaced apart from each other and provided to be inclined with respect to the upper reinforcing bar, an upper member having a semicircle-shaped upper reinforcing bar coupling groove, and lower members being formed to vertically protrude from the lower end of each side member and having semicircle-shaped lower reinforcing bar coupling grooves. The side members and the lower members are formed to be inclined, such that a line connecting the upper part of the upper reinforcing bar coupling groove and the lower end of the lower reinforcing bar coupling groove has a vertical distance, and is perpendicular to the longitudinal direction of the upper reinforcing bar when the one-touch coupling clip is combined to the upper reinforcing bar and the lower reinforcing bar intersecting each other orthogonally.

7 Claims, 9 Drawing Sheets

(51) Int. Cl.
  *E04C 5/20* (2006.01)
  *E04C 5/01* (2006.01)

(56) References Cited

U.S. PATENT DOCUMENTS

| | | | | | |
|---|---|---|---|---|---|
| 871,210 | A | * | 11/1907 | Cummings | E04C 5/168 52/686 |
| 910,399 | A | * | 1/1909 | Lidseen | E04C 5/168 52/686 |
| 1,120,374 | A | * | 12/1914 | Craven | E04C 5/168 52/686 |
| 1,434,352 | A | * | 10/1922 | Ramsay | E04C 5/167 403/395 |
| 3,107,932 | A | * | 10/1963 | Johnson | E04G 7/18 24/335 |
| D781,683 | S | * | 3/2017 | Yi | D8/354 |
| 2007/0044423 | A1 | * | 3/2007 | Funk | E04C 5/168 52/714 |
| 2009/0289797 | A1 | | 11/2009 | Sakama | |
| 2014/0270920 | A1 | * | 9/2014 | Bacon | F16B 2/14 403/241 |

FOREIGN PATENT DOCUMENTS

| | | |
|---|---|---|
| JP | 2004-183470 A | 7/2004 |
| KR | 20-2009-0008069 U | 8/2009 |
| KR | 10-2009-0122876 A | 12/2009 |

\* cited by examiner (a)

(b)

ONE-TOUCH COUPLING CLIP FOR COUPLING REINFORCING BARS

TECHNICAL FIELD

The present invention relates to a coupling clip for coupling an upper reinforcing bar and a lower reinforcing bar, which orthogonally intersect each other, and more specifically, to a one-touch coupling clip, which is easily manufactured due to its simple structure, is not separated from the reinforcing bars, and facilitates installation thereof.

BACKGROUND ART

In a ferroconcrete structure, reinforcing bars are generally arranged in such a way as to intersect each other in two directions. In general, such intersecting parts are bound and coupled by a coupling wire, such as a wire, using a reinforcing bar coupler. Such work requires lots of time, is laborious, and does not provide an even coupled state.

Moreover, as shown in FIG. 1A, in order that reinforcing bars arranged to intersect each other are arranged to a predetermined height from the bottom of a mold while being coupled, a lower reinforcing bar support is formed at one side and an inverse U-shaped plate type reinforcing bar supporter is provided.

However, such a reinforcing bar supporter may be inclined due to an imbalance of the reinforcing bar supporter because the lower reinforcing bar is bound in a state where the lower reinforcing bar is leaned toward one side of the reinforcing bar supporter, thus, the reinforcing bar may be separated from the reinforcing bar supporter.

Therefore, as shown in FIG. 1B, Korean Patent No. 10-1129961 discloses a reinforcing bar supporter, which includes an elastic wing disposed at the rear of the reinforcing bar supporter to prevent the reinforcing bar from being separated. However, such a conventional reinforcing bar supporter has several disadvantages in that it has a complicated structure due to a combination of the elastic wing made of an elastic material and in that its manufacturing costs rise because it is difficult to manufacture it.

Moreover, the reinforcing bar supporter is inclined to one side because the lower reinforcing bar is also arranged to be leaned toward one side, and the elastic wing may be separated from the reinforcing bar due to transformation of the elastic wing because the elastic wing cannot endure weight of the reinforcing bar depending on thickness or weight of the reinforcing bar.

DISCLOSURE

Technical Problem

Accordingly, the present invention has been made in view of the above-mentioned problems occurring in the prior art, and it is an object of the present invention to provide a one-touch coupling clip for coupling reinforcing bars, which supports a coupled part of an upper reinforcing bar and a lower reinforcing bar in balance so that the upper reinforcing bar and the lower reinforcing bar intersecting each other orthogonally are located at the center, which can couple the reinforcing bars not to be separated from each other, which provides a simple structure without needing an elastic wing, and which can firmly couple the upper reinforcing bar and the lower reinforcing bar by stationary fit.

Technical Solution

To accomplish the above object, according to the present invention, there is provided a one-touch coupling clip for coupling an upper reinforcing bar and a lower reinforcing bar, which intersect each other orthogonally, wherein the one-touch clip is made of synthetic resin, including: a pair of side members spaced apart from each other and provided to be inclined with respect to the upper reinforcing bar; an upper member, for connecting the upper ends of the side members to each other, having a semicircle-shaped upper reinforcing bar coupling groove of which the lower part is open and the radius is the same as the radius of the upper reinforcing bar such that the upper reinforcing bar is inserted into and coupled to the lower front end thereof, wherein an inclined wing part is formed at the rear side of the upper part of the upper reinforcing bar coupling groove to get in close contact with the upper face of the upper reinforcing bar; and lower members being formed to vertically protrude from the lower end of each side member and having semicircle-shaped lower reinforcing bar coupling grooves, each of which the upper part is open and the radius is the same as the radius of the lower reinforcing bar such that the lower reinforcing bar is inserted into and coupled to the upper part thereof in the direction perpendicular to the upper reinforcing bar, wherein a stopper having an inverse U-shaped cross section with an opened lower end is formed at the end portion of each lower member to protrude upwardly for preventing separation of the lower reinforcing bar, wherein the side members and the lower members are formed to be inclined, such that a line connecting the upper part of the upper reinforcing bar coupling groove and the lower end of the lower reinforcing bar coupling groove has a vertical distance, which is equal to the sum of a diameter of the upper reinforcing bar and a diameter of the lower reinforcing bar, and is perpendicular to the longitudinal direction of the upper reinforcing bar when the one-touch coupling clip is combined to the upper reinforcing bar and the lower reinforcing bar intersecting each other orthogonally.

In another preferred embodiment, two upper reinforcing bar coupling grooves are formed side by side.

In another preferred embodiment, the one-touch coupling clip has different colors depending on diameters of the upper reinforcing bar coupling groove and the lower reinforcing bar coupling groove.

In another preferred embodiment, a radio frequency identification (RFID) chip is attached to one side of the one-touch coupling clip.

Advantageous Effects

As described above, the one-touch coupling clip according to an embodiment of the present invention is forcedly fit to the upper and lower reinforcing bars, which intersect each other orthogonally, just by a one-touch action so as to fix the coupled part of the upper and lower reinforcing bars to be located at the center of the coupling clip.

Therefore, the one-touch coupling clip according to the embodiment of the present invention can fix the reinforcing bars firmly and stably without being separated from the reinforcing bars regardless of external shocks.

Additionally, the one-touch coupling clip according to the embodiment of the present invention enables a worker to easily check an arranged state of the reinforcing bars because having different colors according to diameters or combinations of the reinforcing bars.

In addition, in the case that a radio frequency identification (RFID) chip is embedded, the one-touch coupling clip according to the embodiment of the present invention enables the worker to quickly confirm information of the arranged reinforcing bars and also enables the worker to

3 check kinds and arrangement locations of the reinforcing bars in a lump without any damage of concrete even after concrete construction, thereby facilitating non-destructive inspection.

BEST MODE

To accomplish the above object, according to the present invention, there is provided a one-touch coupling clip for coupling an upper reinforcing bar and a lower reinforcing bar, which intersect each other orthogonally, wherein the one-touch clip is made of synthetic resin, including: a pair of side members spaced apart from each other and provided to be inclined with respect to the upper reinforcing bar; an upper member, for connecting the upper ends of the side members to each other, having a semicircle-shaped upper reinforcing bar coupling groove of which the lower part is open and the radius is the same as the radius of the upper reinforcing bar such that the upper reinforcing bar is inserted into and coupled to the lower front end thereof, wherein an inclined wing part is formed at the rear side of the upper part of the upper reinforcing bar coupling groove to get in close contact with the upper face of the upper reinforcing bar; and lower members being formed to vertically protrude from the lower end of each side member and having semicircle-shaped lower reinforcing bar coupling grooves, each of which the upper part is open and the radius is the same as the radius of the lower reinforcing bar such that the lower reinforcing bar is inserted into and coupled to the upper part thereof in the direction perpendicular to the upper reinforcing bar, wherein a stopper having an inverse U-shaped cross section with an opened lower end is formed at the end portion of each lower member to protrude upwardly for preventing separation of the lower reinforcing bar, wherein the side members and the lower members are formed to be inclined, such that a line connecting the upper part of the upper reinforcing bar coupling groove and the lower end of the lower reinforcing bar coupling groove has a vertical distance, which is equal to the sum of a diameter of the upper reinforcing bar and a diameter of the lower reinforcing bar, and is perpendicular to the longitudinal direction of the upper reinforcing bar when the one-touch coupling clip is combined to the upper reinforcing bar and the lower reinforcing bar intersecting each other orthogonally.

MODE FOR INVENTION

Hereinafter, reference will be now made in detail to the preferred embodiment of the present invention with reference to the attached drawings.

Figure 1:
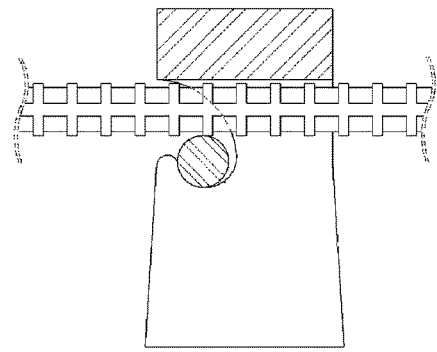
FIG. 1 is a perspective view showing a conventional reinforcing bar supporter.
Figure 1:
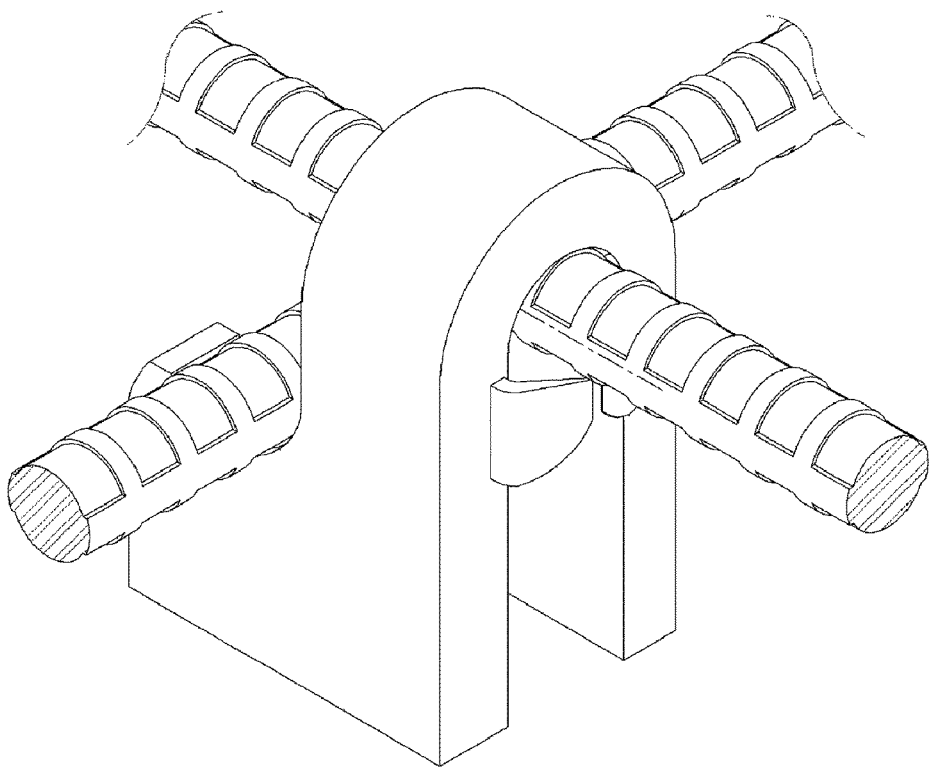
Figure 2:
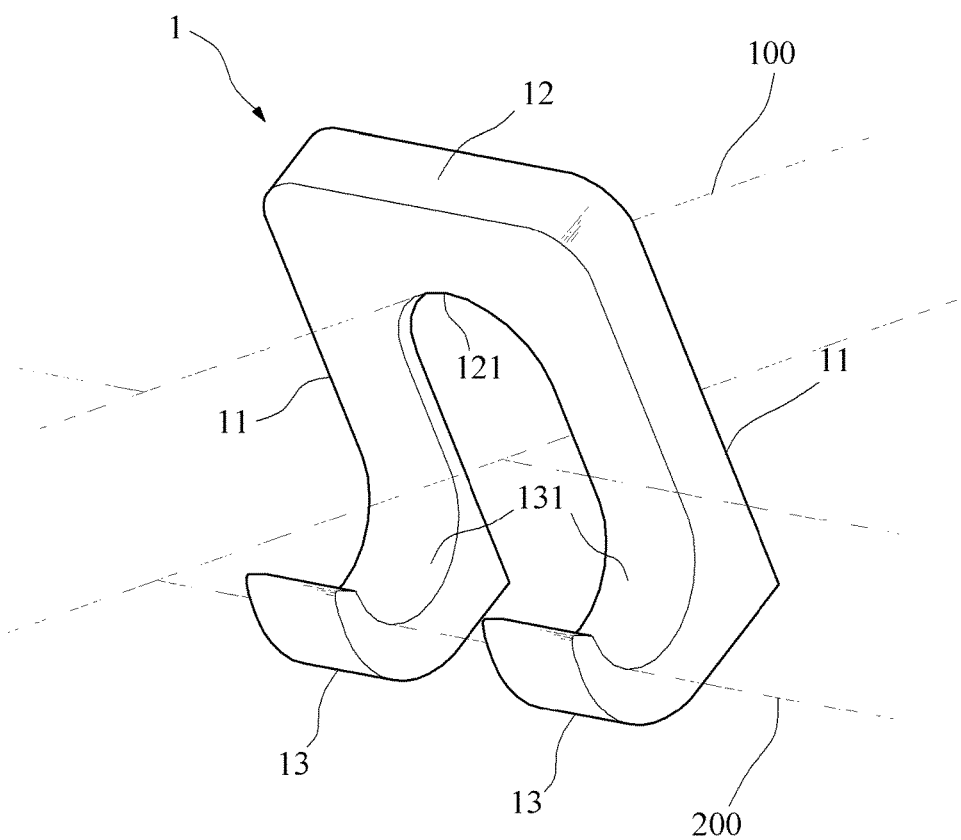
FIG. 2 is a perspective view showing a one-touch coupling clip for coupling reinforcing bars according to a preferred embodiment of the present invention.
Figure 3:
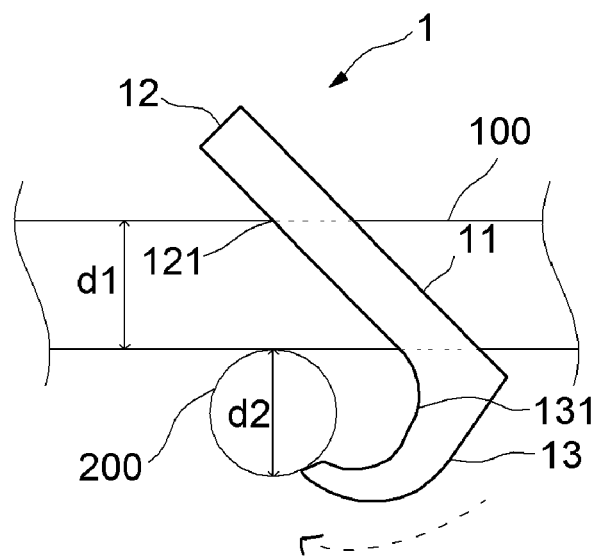
FIG. 3 is a side view showing a coupling sequence of the one-touch coupling clip according to the preferred embodiment of the present invention.
Figure 3:
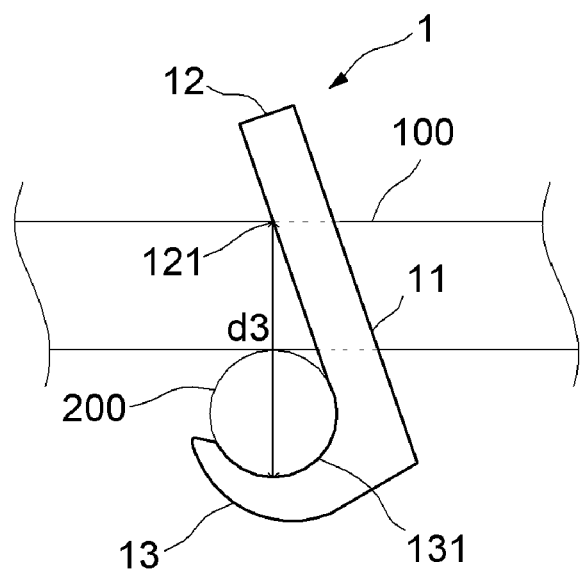
Figure 4:
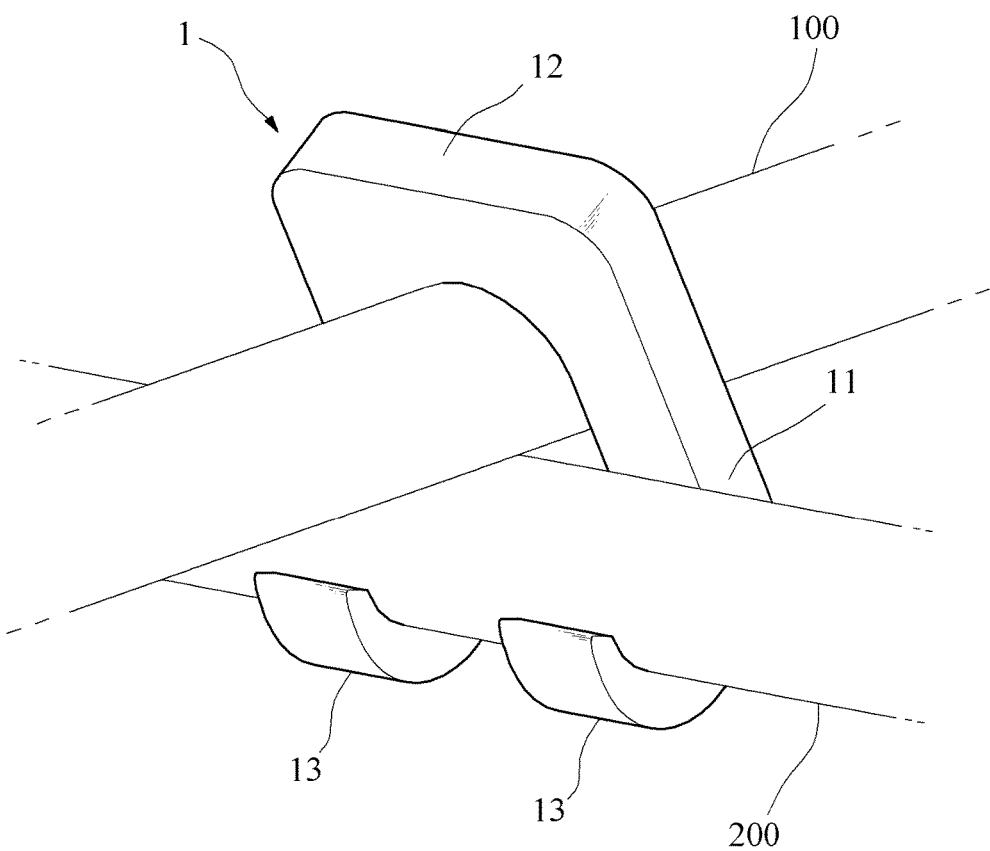
FIG. 4 is a perspective view showing a coupled state of the one-touch coupling clip according to the preferred embodiment of the present invention.

FIG. 2 is a perspective view showing a one-touch coupling clip for coupling reinforcing bars according to a preferred embodiment of the present invention, FIG. 3 is a side view showing a coupling sequence of the one-touch coupling clip according to the preferred embodiment of the present invention, and FIG. 4 is a perspective view showing a coupled state of the one-touch coupling clip according to the preferred embodiment of the present invention.

As shown in FIGS. 2 to 4, the one-touch coupling clip according to a preferred embodiment of the present invention is to couple an upper reinforcing bar 100 and a lower reinforcing bar 200, which intersect each other orthogonally, wherein the one-touch clip is made of synthetic resin. The one-touch coupling clip includes: a pair of side members 11 spaced apart from each other and provided to be inclined with respect to the upper reinforcing bar 100; an upper member 12, for connecting the upper ends of the side members 11 to each other, having a semicircle-shaped upper reinforcing bar coupling groove 121 of which the lower part is open and the radius is the same as the radius of the upper reinforcing bar 100 such that the upper reinforcing bar 100 is inserted into and coupled to the lower front end thereof, wherein an inclined wing part 122 is formed at the rear side of the upper part of the upper reinforcing bar coupling groove 121 to get in close contact with the upper face of the upper reinforcing bar 100; and lower members 13 formed to vertically protrude from the lower end of each side member 11, and having semicircle-shaped lower reinforcing bar coupling grooves 131, each of which the upper part is open and the radius is the same as the radius of the lower reinforcing bar 200 such that the lower reinforcing bar 200 is inserted into and coupled to the upper part thereof in the direction perpendicular to the upper reinforcing bar 100, wherein a stopper 132 having an inverse U-shaped cross section with an opened lower end is formed at the end portion of each lower member 13 to protrude upwardly for preventing separation of the lower reinforcing bar 200, wherein the side members 11 and the lower members 13 are formed to be inclined, such that a line connecting the upper part of the upper reinforcing bar coupling groove 121 and the lower end of the lower reinforcing bar coupling groove 131 has a vertical distance d3, which is equal to the sum of a diameter d1 of the upper reinforcing bar and a diameter d2 of the lower reinforcing bar, and is perpendicular to the longitudinal direction of the upper reinforcing bar 100 when the one-touch coupling clip is combined to the upper reinforcing bar 100 and the lower reinforcing bar 200 intersecting each other orthogonally.

The side members 11 are spaced apart from each other such that the upper reinforcing bar 100 is inserted into the lower part of the side members 11.

Because the side members 11 are inclined with respect to a vertical line when being combined with the upper and lower reinforcing bars 100 and 200, the side members 11 are disposed to make a central line of the upper reinforcing bar coupling groove 121 and the lower reinforcing bar coupling grooves 131 coincide with a coupled position of the upper and lower reinforcing bars 100 and 200. In this instance, the angle of the side members 11 may be varied depending on the diameters of the upper and lower reinforcing bars 100 and 200.

The upper member 12 is to connect the upper ends of the side members 11 with each other, and has the upper reinforcing bar coupling groove 121 formed at the lower part thereof such that the upper reinforcing bar 100 is inserted into the upper reinforcing bar coupling groove 121.

The upper reinforcing bar coupling groove 121 is formed in a semicircular shape having the lower part, which is open, and the radius, which is the same as the diameter of the upper reinforcing bar 100, such that the upper part of the upper reinforcing bar 100 comes into contact with the upper reinforcing bar coupling groove 121 while the upper reinforcing bar 100 is inserted into the upper reinforcing bar coupling groove 121.

The lower members 13 are respectively formed at ends of the side members 11 in vertical parallel, namely, respectively formed to protrude in parallel with the upper reinforcing bar 100. Each of the lower members 13 has the semicircle-shaped lower reinforcing bar coupling groove 131, which the upper part is open and the radius is the same as the radius of the lower reinforcing bar 200 such that the lower reinforcing bar 200 is inserted into the upper part thereof, in parallel with the upper member 12, namely, in the direction perpendicular to the upper reinforcing bar 100.

The side members 11, the upper member 12 and the lower members 13 are formed integrally, and are made of metal or synthetic resin by mold machining. The one-touch reinforcing bar coupling clip 1 according to the preferred embodiment of the present invention can reduce its weight, material costs and manufacturing costs due to its simple structure.

As shown in FIG. 3A, after the upper reinforcing bar coupling groove 121 is fit and coupled to the upper part of the upper reinforcing bar 100, the lower reinforcing bar 200 is rotated in the direction of the lower reinforcing bar 200 based on the upper reinforcing bar coupling groove 121 so as to be fit and caught to the lower reinforcing bar coupling grooves 131, and then, is combined and mounted as shown in FIG. 3B.

Thereby, as shown in FIG. 4, the one-touch coupling clip couples the upper reinforcing bar 100 and the lower reinforcing bar 200, which intersect each other orthogonally.

In this instance, as shown in FIG. 3, when the one-touch coupling clip 1 is viewed from the side, the vertical distance d3, which is at right angles to the longitudinal direction of the upper reinforcing bar 100 connecting the uppermost part of the upper reinforcing bar coupling groove 121 and the lowermost part of the lower reinforcing bar coupling grooves 131 with each other, is equal to the sum of the diameter d1 of the upper reinforcing bar and the diameter d2 of the lower reinforcing bar.

Therefore, the side members 11 and the lower members 13 of the one-touch coupling clip 1 are inclined to be perpendicular to the longitudinal direction of the upper reinforcing bar 100, such that the central line of the upper reinforcing bar coupling groove 121 and the lower reinforcing bar coupling grooves 131 coincides with the coupled position of the upper reinforcing bar 100 and the lower reinforcing bar 200, thereby coupling the upper reinforcing bar 100 and the lower reinforcing bar 200 to support each other stably in balance and to prevent separation from each other. Moreover, the one-touch coupling clip 1 according to the preferred embodiment of the present invention is simple in structure and can be easily combined in a one-touch manner just by the rotation of the clip.

Figure 5:
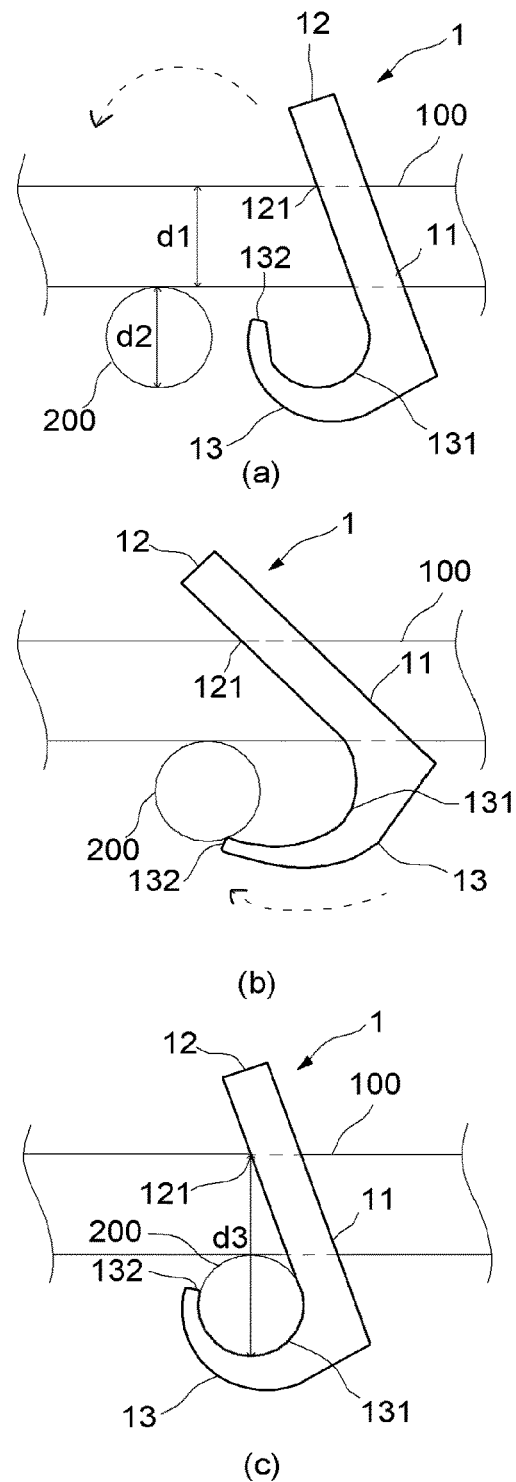
FIG. 5 is a side view showing a coupling sequence of a one-touch coupling clip, which has a stopper.

FIG. 5 is a side view showing a coupling sequence of a one-touch coupling clip, which has a stopper.

As shown in FIG. 5, a stopper 132 for preventing separation of the lower reinforcing bar 200 is formed at the end portion of each lower member 13 to protrude upwardly.

The stopper 132 is formed integrally with the end portion of the lower member 13 to protrude upwardly in such a way that the lower reinforcing bar coupling groove 131 extends.

That is, the stopper 132 has an inner face, with which the lower reinforcing bar 200 gets in contact, and which extends to the semicircle-shaped part of the lower reinforcing bar coupling groove 131. The minimum lineal distance between the inner face of the stopper 132, which surrounds the lower reinforcing bar 200 to prevent separation of the lower reinforcing bar 200, and the side member 11 is slightly shorter than the diameter d2 of the lower reinforcing bar.

Therefore, because the lower members 13 are coupled to the lower reinforcing bar 200 by stationary fit, a wider side surrounds the lower reinforcing bar 200 such that the lower reinforcing bar 200 is not separated.

Figure 6:
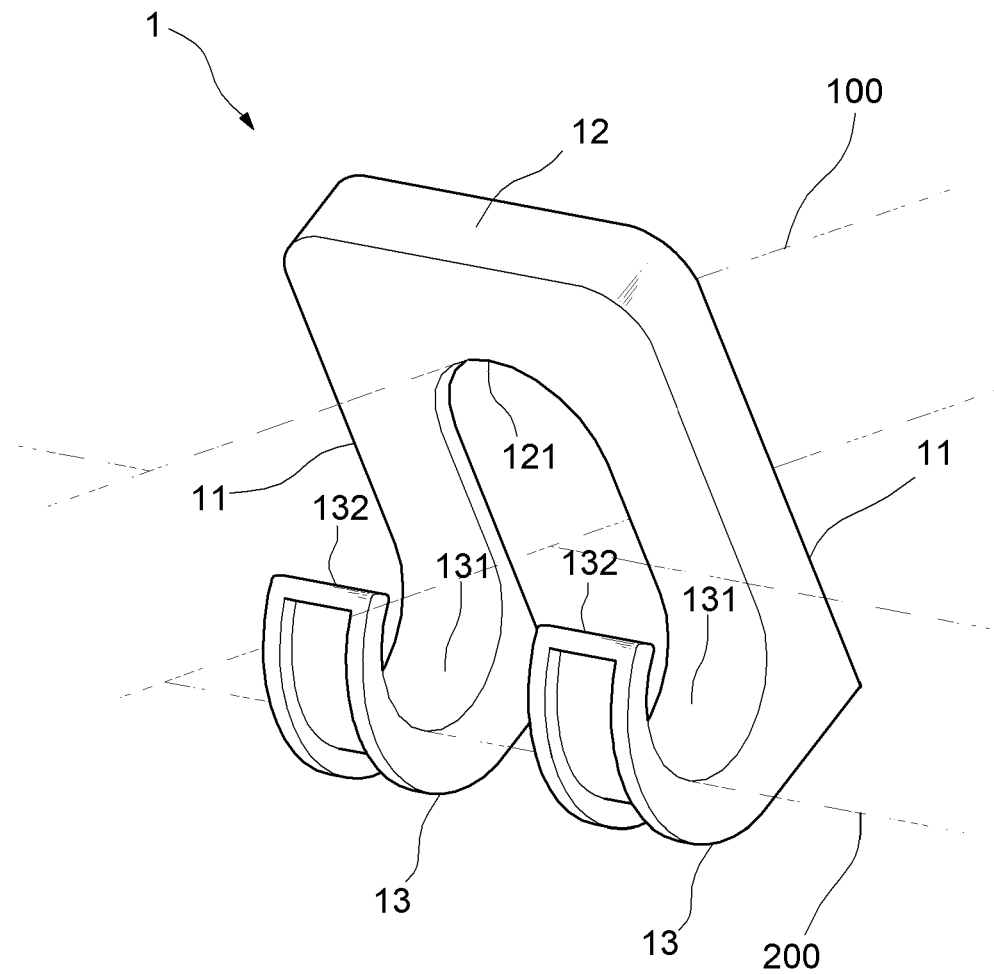
FIG. 6 is a perspective view showing a one-touch coupling clip, which has a stopper having an opened lower end.

FIG. 6 is a perspective view showing a one-touch coupling clip, which has a stopper having an opened lower end.

As shown in FIG. 6, the stopper 132 has a lower end, which is open and has an inverse U-shaped cross section.

Because the stopper 132 requires elasticity for easy coupling with the lower reinforcing bar 200, it is necessary to form a hollow part in the stopper to provide an elastic force by its shape. Therefore, the stopper 132 has an inverse U-shaped groove formed at the lower end thereof. When the stopper 132 is combined with the lower reinforcing bar 200, the stopper 132 is bent flexibly, such that the lower reinforcing bar 200 is inserted into the lower reinforcing bar coupling groove 131 and coupled to get in close contact with the lower reinforcing bar coupling groove 131 after being inserted.

The inverse U-shaped groove is formed integrally from the lower end of the stopper 132 to the lower end of the lower member such that the stopper 132 and the lower member 13 have elasticity, thereby being easily coupled with the lower reinforcing bar 200.

Figure 7:
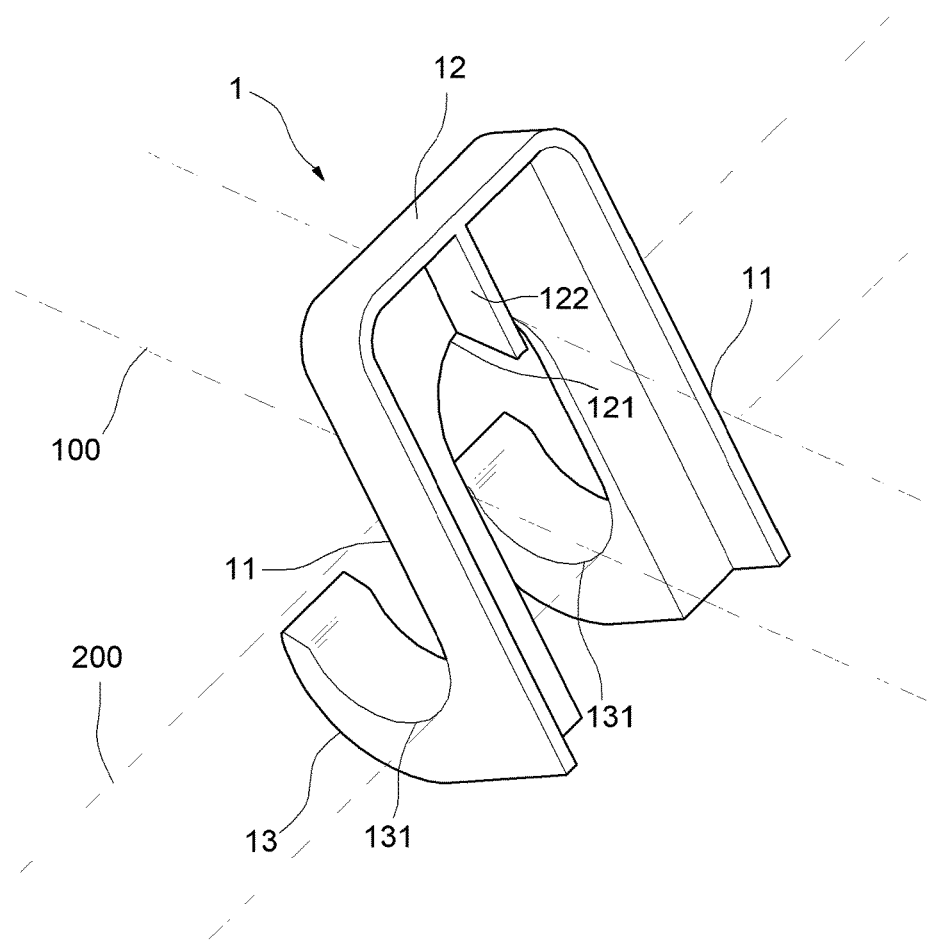
FIG. 7 is a perspective view showing a one-touch coupling clip, which has a wing part.
Figure 8:
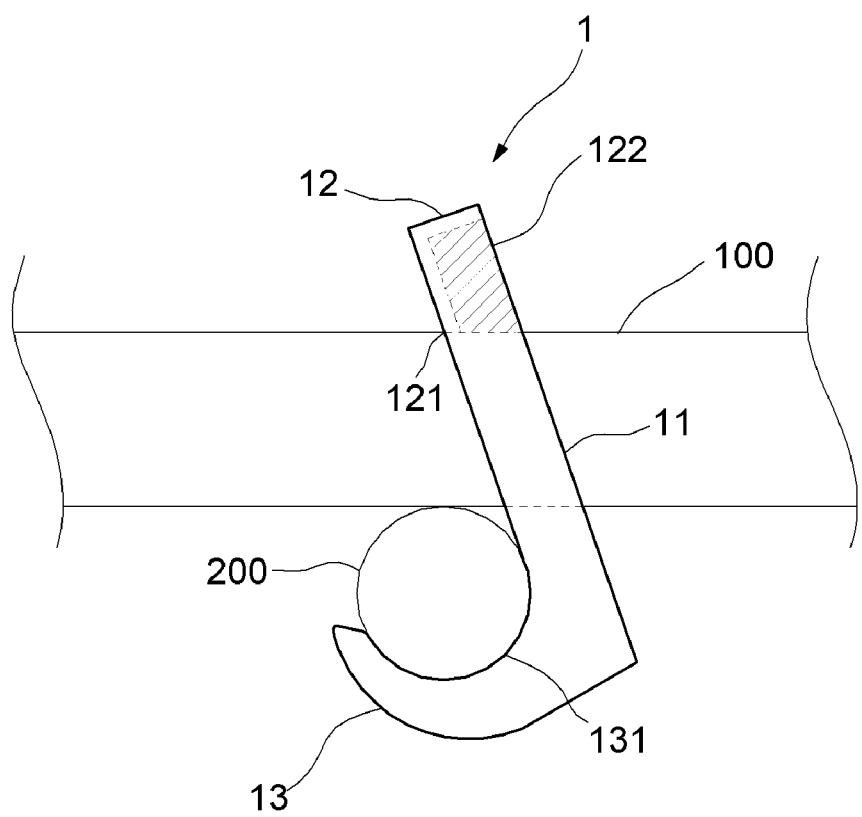
FIG. 8 is a side view of FIG. 7.

FIG. 7 is a perspective view showing a one-touch coupling clip, which has a wing part, and FIG. 8 is a side view of FIG. 7.

As shown in FIGS. 7 and 8, an inclined wing part 122 is disposed at the rear side of the upper part of the upper reinforcing bar coupling groove 121 to get in close contact with the upper face of the upper reinforcing bar 100.

When the upper reinforcing bar 100 is coupled with the upper reinforcing bar coupling groove 121, a space part may be formed between the upper reinforcing bar 100 and the upper member 12, and the wing part 122 is disposed in the space part.

The wing part 122 may be a small piece disposed at the rear side of the upper part of the semicircle-shaped upper reinforcing bar coupling groove 121, has the lower end which meets the upper face of the upper reinforcing bar 100 to be supported, and may be varied in its shape depending on shapes of the upper member 12 or the side members 11.

Therefore, the wing part 122 gets in close contact with the upper part of the upper reinforcing bar 100 to prevent the one-touch coupling clip 1 from rotating at more than a predetermined angle, such that the coupling of the reinforcing bars is not released and is fastened firmly. Furthermore, the wing part 122 serves as a rib to reinforce rigidity of the upper member 12.

Figure 9:
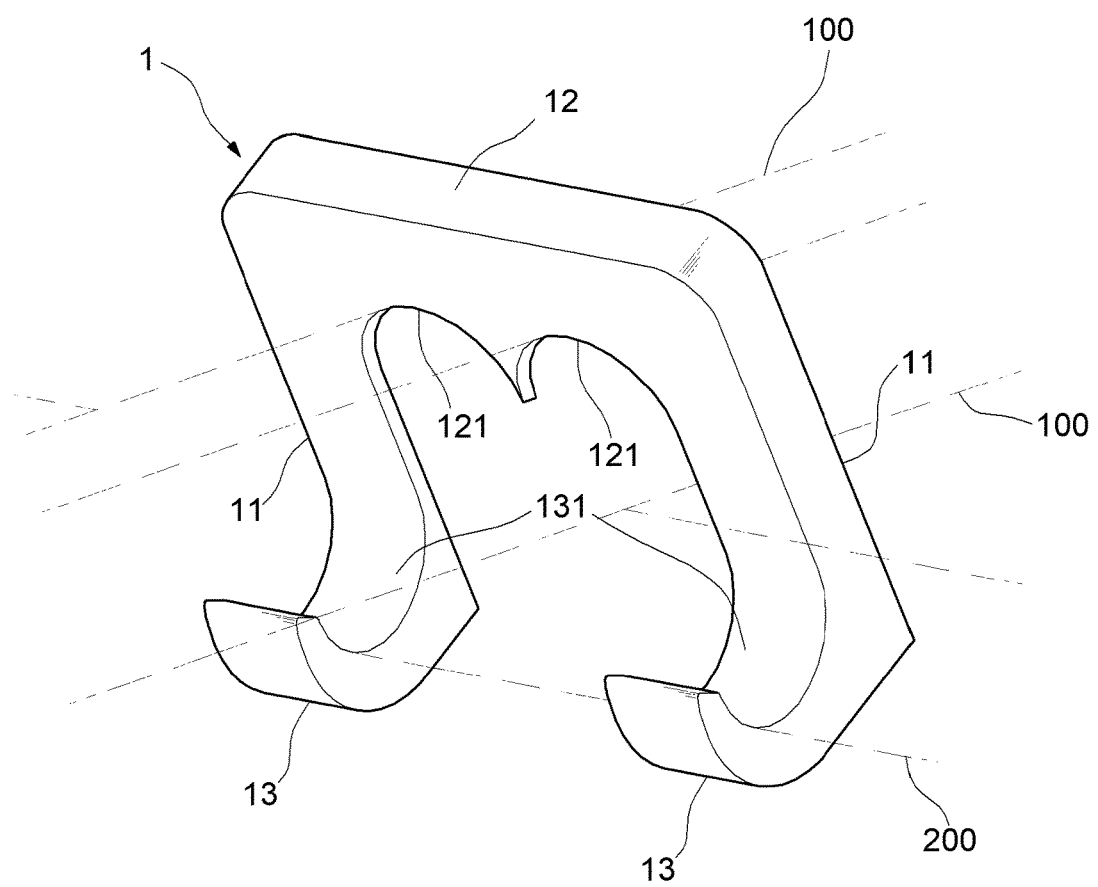
FIG. 9 is a perspective view showing a one-touch coupling clip, which has a pair of upper reinforcing bar coupling grooves.

FIG. 9 is a perspective view showing a one-touch coupling clip, which has a pair of upper reinforcing bar coupling grooves.

As shown in FIG. 9, the upper member 12 has two upper reinforcing bar coupling grooves 121, which are formed at the lower part of the upper member 12 side by side.

The upper reinforcing bar coupling grooves 121 are formed on the upper member 12 in a semicircular shape of which the diameter is the same as the diameter of the upper reinforcing bar 100. The two upper reinforcing bar coupling grooves 121 are successively formed side by side and are mounted at a portion where a pair of the upper reinforcing bars 100 are overlapped with each other by lap splice.

The one-touch coupling clip 1 may be varied in its color depending on diameters of the upper reinforcing bars and the lower reinforcing bar coupling groove 131.

The one-touch coupling clip 1 may be used in various combinations because the coupled reinforcing bars have different diameters. Therefore, when the one-touch coupling clips 1 with various colors according to various combinations are prepared, it may provide convenience in installation, and enables a worker to rapidly confirm which reinforcing bars are used due to the colors of the clips after the installation.

In another preferred embodiment, in the case that the diameter d1 of the upper reinforcing bar and the diameter d2 of the lower reinforcing bar are different from each other, the colors of the upper member 12 and the side members 11 may be different from the color of the lower members 13.

Therefore, when the one-touch coupling clips respectively have designated colors according to diameters of the reinforcing bars, it enables the worker to grasp the diameters of the reinforcing bars from a long distance and to conveniently confirm whether the reinforcing bars are properly arranged according to a bar arrangement drawing.

A radio frequency identification (RFID) chip may be attached to one side of the one-touch coupling clip 1.

The RFID chip is a system to identify an ID and process information by frequencies in a non-contact type using a small-sized semiconductor chip, and is divided into an active type and a passive type according to whether a battery exists or not.

In order to be attached and used to the one-touch coupling clip 1, a passive type RFID chip is preferable. The passive type RFID chip is operated by the electromagnetic field when an electronic reader comes close to the RFID chip without any power supply, and is semipermanently usable.

Because information of diameters of the upper reinforcing bar coupling groove 121 and the lower reinforcing bar coupling groove 131 of the one-touch coupling clip 1 is inputted in the RFID chip, the worker can easily and rapidly find information of the diameters d1 and d2 of the upper and lower reinforcing bars coupled to the upper and lower reinforcing bar coupling grooves 121 and 131 through a mobile reader.

Moreover, the worker can correctly collect information of reinforcing bar arrangement even though reinforced concrete is being used after being poured and hardened. So, because the worker can correctly grasp diameters of reinforcing bars and bar arrangement positions inside the reinforced concrete structure, it enables the worker to do a non-destructive inspection.

INDUSTRIAL APPLICABILITY

As described above, the one-touch coupling clip according to the preferred embodiments of the present invention is forcedly fit near to the upper and lower reinforcing bars, which intersect each other orthogonally, just by a simple one-touch action such that the coupled part of the upper and lower reinforcing bars is fixed at the center of the coupling clip, thereby fixing the upper and lower reinforcing bars stably and firmly without being separated from the reinforcing bars in spite of external shocks. Moreover, the one-touch coupling clip according to the preferred embodiments of the present invention enables a worker to easily check an arranged state of the reinforcing bars because having different colors according to diameters or combinations of the reinforcing bars.

What is claimed is:

1. A one-touch coupling clip for coupling an upper reinforcing bar (100) and a lower reinforcing bar (200), which intersect each other orthogonally, wherein the one-touch clip is made of synthetic resin, comprising:
    a pair of side members (11) spaced apart from each other and provided to be inclined with respect to the upper reinforcing bar (100);
    an upper member (12), for connecting the upper ends of the side members (11) to each other, having a semi-circle-shaped upper reinforcing bar coupling groove (121) of which a lower part is open and the radius is the same as the radius of the upper reinforcing bar (100) such that the upper reinforcing bar (100) is inserted into and coupled to a lower front end thereof, wherein an inclined wing part (122) is formed at a rear side of an upper part of the upper reinforcing bar coupling groove (121) to get in dose contact with an upper face of the upper reinforcing bar (100); and
    lower members (13) protruding from the lower end of each side member (11) and having semicircle-shaped lower reinforcing bar coupling grooves (131), wherein an upper part of each lower reinforcing bar coupling groove (131) is open and the radius of each lower reinforcing bar coupling groove (131) is the same as the radius of the lower reinforcing bar (200) such that the lower reinforcing bar (200) is inserted into and coupled to the upper part thereof of each lower reinforcing bar coupling groove (131) in the direction perpendicular to the upper reinforcing bar (100), wherein a distal end portion of each lower member (13) is formed as a stopper (132) which has an inverse U-shaped cross section with an opened lower end is and protrudes upwardly for preventing separation of the lower reinforcing bar (200),
    wherein the side members (11) and the lower members (13) are formed to be inclined, such that a line connecting the upper part of the upper reinforcing bar coupling groove (121) and the lower end of the lower reinforcing bar coupling groove (131) has a vertical distance (d3), which is equal to the sum of a diameter (d1) of the upper reinforcing bar (100) and a diameter (d2) of the lower reinforcing bar (200), and is perpendicular to the longitudinal direction of the upper reinforcing bar (100) when the one-touch coupling clip is combined to the upper reinforcing bar (100) and the lower reinforcing bar (200) intersecting each other orthogonally,
    wherein the upper and lower reinforcing bars (100, 200) share a common radial direction which is a radial direction of the upper reinforcing bar as well as a radial direction of the lower reinforcing bar,
    wherein each side member (11), when taken from a sectional view of the lower reinforcing bar (200), extends in a direction inclined to, without being parallel with, the common radial direction shared by the upper and lower reinforcing bars (100, 200), and wherein the inclined wing part (122) has a lower surface extending in a direction along a length direction of the upper reinforcing bar (100), and the lower surface of the inclined wing part (122) gets in dose contact with the upper face of the upper reinforcing bar (100).

2. The one-touch coupling clip according to claim 1, wherein two upper reinforcing bar coupling grooves (121) are formed side by side.

3. The one-touch coupling clip according to claim 1, wherein the one-touch coupling clip (1) has different colors depending on diameters of the upper reinforcing bar coupling groove (121) and the lower reinforcing bar coupling groove (131).

4. The one-touch coupling clip according to claim 1, wherein a radio frequency identification (RFID) chip is attached to one side of the one-touch coupling clip (1).

5. The one-touch coupling clip according to claim 2, wherein a radio frequency identification (RFID) chip is attached to one side of the one-touch coupling clip (1).

6. The one-touch coupling clip according to claim 2, wherein the one-touch coupling clip (1) has different colors depending on diameters of the upper reinforcing bar coupling groove (121) and the lower reinforcing bar coupling groove (131).

7. The one-touch coupling clip according to claim 1, wherein:

the inclined wing part (122) comprising a rib protruding downward from the upper member (12); and the lower surface of the inclined wing part (122), when taken from a sectional view of the lower reinforcing bar (200), extends along the upper face of the upper reinforcing bar (100) in a direction inclined to a top surface of the upper member (12).

* * * * *